United States Patent [19]

Cooper

[11] 4,108,767

[45] Aug. 22, 1978

[54] SEPARATION OF AN AQUEOUS OR WATER-MISCIBLE LIQUID FROM A FLUID MIXTURE

[75] Inventor: William D. Cooper, Bellingham, Wash.

[73] Assignee: Georgia-Pacific Corporation, Portland, Oreg.

[21] Appl. No.: 609,249

[22] Filed: Sep. 2, 1975

[51] Int. Cl.$^2$ .................... B01D 11/04; B01D 17/04
[52] U.S. Cl. ................................. 210/42 S; 210/43; 210/44; 252/329
[58] Field of Search ............ 210/40, 41, 42, 222, 210/223; 260/124 R; 209/214, 1; 252/62.51, 62.53, 62.56, 62.52, 329

[56] References Cited

U.S. PATENT DOCUMENTS

| | | | |
|---|---|---|---|
| 3,483,969 | 12/1969 | Rosensweg | 210/222 |
| 3,531,413 | 9/1970 | Rosensweg | 252/62.56 |
| 3,544,460 | 12/1970 | Martham et al. | 260/124 R |
| 3,764,540 | 10/1973 | Khalalalla | 252/62.56 |
| 3,769,272 | 10/1973 | Hintz et al. | 260/124 R |
| 3,806,449 | 4/1974 | Kaiser | 210/DIG. 26 |
| 3,843,540 | 10/1974 | Reimers et al. | 252/62.52 |
| 3,890,224 | 6/1975 | Weiss | 210/223 |
| 3,917,538 | 11/1975 | Rosensweg | 252/62.52 |
| 3,926,789 | 12/1975 | Shubert | 209/214 |
| 4,018,691 | 4/1977 | Neal | 252/62.54 |
| 4,019,995 | 4/1977 | Briggs et al. | 252/62.53 |

*Primary Examiner*—Theodore A. Granger
*Attorney, Agent, or Firm*—Peter P. Chevis

[57] ABSTRACT

A process for the separation of a dispersed aqueous or water-miscible liquid from a fluid mixture by addition of a water-soluble, organically-based, ferromagnetic composition to combine with the dispersed liquid and subjecting the fluid mixture to a magnetic field to separate the aqueous or water-miscible liquid.

12 Claims, No Drawings

SEPARATION OF AN AQUEOUS OR WATER-MISCIBLE LIQUID FROM A FLUID MIXTURE

This invention pertains to a process for recovery or separation from a fluid of an aqueous or water-miscible liquid dispersed therein. More particularly, it pertains to a process for the separation of a dispersed aqueous or a water-miscible liquid from a water immiscible liquid or a gaseous stream by use of a magnetic field or force.

In many chemical processes, streams or products of water-immiscible organic liquids are obtained in which, for example, water is dispersed to various extents. In many of the products or process streams, only partial separation of the water from the organic liquid may be obtained by settling, or centrifugation, and when emulsions are obtained these methods may be totally ineffective. Also, in many situations, even though a major portion of the water may be removed by these methods, small particles of water remain dispersed within the organic liquid and further processing is required.

Likewise, gas streams containing water or water-miscible liquids are often obtained as in evaporation or as the result of contacting the gaseous stream with the liquid for absorption of particular constituents, quenching for temperature control, or the removal of solid particles such as dust or other solids. Generally, the liquid particles are entrained in the gas stream and further processing is necessary to remove them. Various entrainment separators may be used which mainly rely upon the difference in density to effect the separation such as in a cyclone, or an impingement type separator, or packing. While most of the separators are generally successful in removing the major portion of larger particles of the entrained liquid from the gaseous stream, they are generally only partially successful in removing the finely dispersed particles.

Magnets and magnetic fields have been used for separation of magnetic particles such as iron from non-magnetic streams or products. High gradient magnetic separators such as disclosed in U.S. Pat. Nos. 3,567,026; 3,627,678; and 3,770,629 have been developed for this and other purposes. The recovery of organic and inorganic substances from waste water has also been proposed wherein the waste stream is seeded with recyclable magnetizable particles and a flocculant to obtain magnetic agglomerates that can then be separated by use of a magnetic field. U.S. Pat. No. 3,635,819 discloses a process for cleaning up oil spills on water by dispersing a suspension of finely divided magnetic particles in kerosene or other hydrocarbon base on the oil spill and then employing a magnetic field to attract and pick up the oil. Also, the use of magnetite in a dry form has been suggested for recovery of oil from waste streams. The addition of fine particles of magnetite results in the oil agglomerating around the dry particles of magnetite which can then be removed by filtering magnetically. While the above processes are operative in the streams containing low oil concentration, they are impractical for separation of water from oil and other organic liquids where water is present as a minor constituent, or where emulsions are encountered, or where a non-contaminated organic product is desired.

It is, therefore, an object of this invention to provide a process for the separation from a fluid of water or a water-miscible liquid dispersed in the fluid. Another object is to provide a process characterized by the separation of the water from the water immiscible liquid by use of a magnet or a magnetic field. A further object is to provide a process for separation of water from an emulsion. A still further object is to provide a process for the recovery of water or a water-miscible liquid from gaseous streams by use of a magnetic field.

The above and other objects are attained by the invention by adding a water soluble ferromagnetic composition selected from the group consisting of ferromagnetic iron lignosulfonates, ferromagnetic iron sulfonated tannins, and ferromagnetic iron compositions of a sulfonated phenol condensed with an aldehyde to the fluid containing the dispersed aqueous or water-miscible liquid. The water-soluble ferromagnetic composition is intermixed with the fluid mixture in an amount sufficient to contact and mix with the aqueous or water-miscible liquid dispersed in the fluid. The fluid is then subjected to a magnetic field resulting in the dispersed liquid with the ferromagnetic composition being attracted to a magnetic field and thus separated from the fluid.

The organically-based ferromagnetic compositions may be conveniently prepared by dissolving an iron compound and a lignosulfonate, sulfonated tannin or sulfonated phenol-aldehyde in water, adding 1 equivalent of alkali per equivalent of iron, and reacting the mixture in a manner to permit the formation of magnetite or other magnetic oxides of iron. The iron compound is dissolved in the water in an amount at least twice the stoichiometric amount of iron, expressed in ferric iron, necessary for reaction with the sulfonate groups of the lignosulfonate, sulfonated tannin, or the sulfonated phenol condensation product. Usually a change in the oxidation state of the iron may be required in the presence of the alkali to obtain the iron in both the ferric and ferrous states in the desired proportions, i.e., approximately those present in magnetite. When a ferrous iron compound is used, the reaction of the iron with the lignosulfonate or the other sulfonated products is normally carried out by heating the mixture with agitation in air or under other relatively mild oxidizing conditions sufficient to oxidize a portion of the ferrous iron without substantial oxidation or degradation of the lignin or other sulfonated products. When a mixture of ferrous and ferric iron compounds in the proper proportion to obtain magnetite is added to the heated solution at a suitable pH, the oxidation is not necessary and the ferromagnetic composition may be obtained upon heating the mixture with sufficient alkali. The composition obtained, having an iron content of from 9 to 45, preferably in the range of 15 to 35 weight percent, has the magnetic iron oxide or iron hydroxide bound to the lignosulfonate, sulfonated tannin, or sulfonated phenol aldehyde condensation product in some manner to give a ferromagnetic composition having magnetic susceptibility, based upon the iron content, in the range of magnetite. When dissolved in water, the organically-based ferromagnetic composition has the characteristic of a polyelectrolyte solution and no separation of the reacted iron from the lignosulfonate, sulfonated tannin, or the sulfonated phenol condensation product can be obtained by filtration, centrifugation or by gel permeation chromatography. Since the organically-based ferromagnetic compositions have properties of a polyelectrolyte solution, the use of these solutions of the ferromagnetic compositions under the varying conditions obtained in emulsions or water-organic liquid mixtures will not affect the magnetic properties of the solution. The ferromagnetic composition solution in combining with the water or water-miscible particles will maintain its magnetic susceptibility and be removed without the magnetic constituents separating from the aqueous phase as may be obtained with dispersions of magnetite or other magnetic particles in an aqueous solution. Other methods for the preparation of these ferromagnetic compositions and properties thereof are described in more detail in patent application Ser. No. 439,579 filed Feb. 4, 1974, by William Scott Briggs et al, now abandoned, and patent application Ser. No. 608,462 filed Aug. 28, 1975 by John A. Neal, now U.S. Pat. No. 4,018,691, which we incorporated herein by reference.

As disclosed in the above references, lignosulfonates and sulfonated tannins from any source may be used in preparation of the ferromagnetic composition. When spent sulfite liquors or sulfite digestion products of bark are used as the lignosulfonate or sulfonated tannin source, generally the products are purified to some extent to partially remove the low-molecular weight organic and non-lignin constituents such as sugars and sugar carboxylic acids.

The condensation of a sulfonated phenol and aldehyde may be effected through the various known methods for condensation of phenols with aldehydes. Generally the impurities which may be present in the product prepared by most of the processes are not present at a level that is detrimental. A convenient method for preparation of the condensation product of a sulfonated phenol and aldehyde is to sulfonate the phenol with sulfuric acid and then react the sulfonated phenol with aldehyde similar to that described in U.S. Pat. Nos. 2,681,312 and 3,214,373. Preferably the monohydric phenols are used which are preferably sulfonated to the extent to obtain a predominantly monosulphonated phenol. The sulfonated phenols are condensed with aldehydes having up to 6 carbon atoms to the extent that a high-molecular weight product is obtained which is still water-soluble.

In the recovery of the dispersed liquid from the fluids, the organically-based, ferromagnetic composition is added and intermixed with the fluid to contact and mix the organically-based, ferromagnetic composition with the dispersed liquid particles in the fluid. The amount of the ferromagnetic composition added may be widely varied as long as a sufficient amount of the ferromagnetic composition is used to provide the necessary concentration of the ferromagnetic composition in the dispersed liquid to be attracted by the strength of the magnetic field being used for the recovery. With a sufficiently high intensity magnetic field, a trace amount may be sufficient. However, generally the ferromagnetic composition added is in an amount to supply a concentration of ferromagnetic composition in the dispersed liquid in the range of from about 0.5 to 20%. The actual amount used depends to a certain extent upon the magnetic susceptibility of the ferromagnetic composition used and also the system in which it is employed. For example, for an emulsion of water and an organic liquid, a concentration in the range of 5 to 20% may be desirable. At these concentrations, generally sufficient amount of the ferromagnetic composition is contacted and combined with the water in the emulsion or mixture so that a magnetic field of relative low strength is effective in breaking the emulsion and effecting the separation. For liquids dispersed in a gaseous stream, the concentration used may be considerably less, being usually in the lower portion of the above range and at times as low as 0.01 percent.

While the organically-based ferromagnetic composition may be added in dry form for fluids containing dispersions of aqueous liquids, preferably a water solution of the ferromagnetic composition is used. Practically any concentration of the ferromagnetic solution may be used as long as the solution when intermixed with the dispersed liquid will provide the required concentration of the ferromagnetic composition for the magnetic field used. Since the addition of the solution adds water to the fluid and must be removed with the liquid originally dispersed or emulsified with the fluid, it is advantageous to use concentrated solutions of the ferromagnetic composition to minimize the amount of water which is added. However, the viscosity of the solution of the ferromagnetic composition increases rapidly with concentrations above about 45 to 50% making it more difficult to intermix and contact with the dispersed liquid particles in the fluid. Solutions containing from 10 to 35% of the ferromagnetic composition are usually used for emulsions or liquid-liquid mixtures. At this concentration, the viscosity of the solution is sufficiently low to permit relatively easy intermixing of the solution with the emulsion or fluid. The viscosity of the resulting ferromagnetic composition when combined with the dispersed liquid is likewise at the lower level which generally permits easier separation from the fluid. At times it may be desirable to use the ferromagnetic composition at lower concentrations for recovery of certain water-miscible liquids. The intermixing of the ferromagnetic composition with certain water-miscible liquids at high concentrations may result in the formation of two phases. For example, the addition of a concentrated ferromagnetic lignosulfonate solution to a lower alcohol may result in a partition or fractionation being obtained with the ferromagnetic composition being distributed unevenly between the two phases. As the result, the phases may have different magnetic susceptibilities and not be uniformly removed. This salting-out or fractionation effect may be substantially eliminated or minimized by using larger quantities of less concentrated ferromagnetic composition solution.

While products or streams having water or aqueous solutions as the dispersed liquid are most often obtained, the process may be used for the removal or separation of any water miscible liquid dispersed in a fluid, liquid or gas, where the dispersed liquid will mix with an aqueous solution of the ferromagnetic composition. It is not necessary for the dispersed liquid to be completely miscible with water or the ferromagnetic solution. Any liquid which is partially miscible to intermix with sufficient amount of the ferromagnetic composition to be attracted by the magnetic force may be removed. Since only relatively low concentrations of ferromagnetic compositions are necessary to be effective, many liquids are sufficiently miscible to be removed. Examples of water miscible organic liquids which may be removed are the lower aliphatic alcohols, allyl, furfuryl, and tetrahydrofurfuryl alcohols, glycols and diols such as pentenediol acetone, methylethylketone, pyridine, aniline, and other water soluble or partially water miscible liquids.

Various known magnetic separation equipment may be used for the separation of the dispersed liquids. The equipment as described in U.S. Pat. Nos. 3,567,026; 3,627,678; and 3,770,629 are illustrative of some of the more effective devices. In these devices, the fluid to be subjected to the magnetic field is passed through a steel wool-type packing which is magnetized by a magnetic field to provide a large number of regions of very high magnetic field gradient. For example, for recovery of water from an emulsion, the apparatus is magnetized and the emulsion is filtered through the magnetized packing resulting in the emulsion breaking and the water which has been intermixed with ferromagnetic composition is retained on the packing. Periodically the apparatus is demagnetized and flushed with water to remove the ferromagnetic composition with the intermixed water which has been retained in the packing by the magnetic field.

Similar equipment may also be used for the removal of a dispersed liquid from a gaseous stream. In most liquid-gas contact operations, the present equipment and process may be readily modified to use the magnetic separation step by providing for the addition or spraying of the ferromagnetic composition into the gaseous stream and the installation of a magnetic separator. For example, in air scrubbers, air containing dust or other solid particles in generally contacted with water by spray or other means to wash down the dust and solid particles. The water containing effluent is often passed through a cyclone to remove the major portion of the water particles dispersed in the gas stream and then may be passed through an additional entrainment separator for removal of additional liquid. Many of the entrainment separators used are wire mesh packings which may be replaced by the equipment noted above or modified to be subjected to a magnetic field. The ferromagnetic composition may be added to the water or the liquid used to wash down the dust particles. Since the wash liquid may often be recycled, the ferromagnetic composition may be added initially to the water to obtain the desired concentration and then added only to the make-up water or liquid. The processes and equipment as disclosed in U.S. Pat. Nos. 2,195,707; 3,011,769; and 3,138,442 are illustrative of some of the gas scrubbing operations which may be conveniently used with the process. Corresponding modifications may be made to other processes where gaseous streams are obtained with entrained liquid. For evaporator or other effluents, the ferromagnetic composition may be simply sprayed into the effluent discharge line to intermix with the entrained liquid, and the effluent then passed through a magnetic separator to remove the entrained liquid mixed with the ferromagnetic composition.

The organically-based, ferromagnetic compositions are relatively stable in aqueous solutions from a pH of about 2 to 13 and temperatures up to about 230° C so that in using these compositions a pH and a temperature adjustment may be made to enhance the separation, especially from pH and temperature sensitive emulsions or liquid mixtures. The ferromagnetic compositions are sufficiently insoluble in many organic liquids so that they may be used for the separation of water and other water-miscible liquids dispersed in these liquids. Even for fluids in which the ferromagnetic composition may be partially soluble, the affinity of the ferromagnetic composition for water is such that the major portion of the ferromagnetic composition will remain with the aqueous phase imparting considerably greater magnetic susceptibility to the water phase than to the organic liquid or water-immiscible phase to enable a separation to be made. The compositions are likewise stable to inorganic electrolytes so that the mixtures may contain inorganic salts. The presence of electrolytes such as inorganic salts in some emulsions may have a stabilizing effect upon the emulsion which may require a higher concentration of the ferromagnetic composition or a stronger magnetic field to effect the separation as rapidly as from mixtures free of electrolyte.

The examples further illustrate the invention.

EXAMPLE I

An emulsion was prepared by emulsifying 10 milliliters of water in 90 milliliters of no. 3 mineral oil. Upon emulsification, the sample was dividedl into two parts. One half of the sample was allowed to stand at room temperature for 1 hour after which time only partial separation was obtained with the beginning of the formation of two phases being observed. The other half of the sample was mixed with 5 milliliters of a 20% solution of a ferromagnetic lignosulfonate composition containing about 13% iron on a dry basis. After intermixing the ferromagnetic composition solution with the emulsion, a rectangular ceramic magnet, 1-8/8 inches $\times$ $\frac{7}{8}$ inch $\times$ $\frac{3}{8}$ inch having a 3 lb. lift, was placed in the emulsion. The two liquids separated into two phases within ten minutes with aqueous phase being positioned around the surface of the magnet which was removed from the oil by lifting out the magnet.

The ferromagnetic lignosulfonate composition was prepared by adding a mixture of ferrous sulfate and ferric sulfate in equal molar amounts to a sodium lignosulfonate aqueous solution containing about 13% sodium lignosulfonate. The mixture was reacted at 90° C with the periodic addition of caustic to maintain the reaction mixture at a pH of 7. The mixture upon drying contained 13% iron and had a relative magnetic susceptibility, based upon the iron content, about 40% greater than a sample of magnetite.

EXAMPLE II

Water was recovered from an oil and water emulsion by passing the emulsion down an inclined trough containing magnets.

An emulsion was prepared of water in oil by intermixing 10 milliliters of water and 90 milliliters of mineral oil. In the formation of the emulsion, 0.2 grams each of commercial emulsifiers sold under the trademarks of SPAN 20 AND SPAN 60 were added. To this emulsion, 10 milliliters of an aqueous solution of ferromagnetic lignosulfonate were mixed with the emulsion. The ferromagnetic lignosulfonate composition contained about 20% iron on a dry basis. After intermixing the solution of the ferromagnetic composition with the emulsion, the emulsion was poured into one end of the trough and permitted to flow down the trough. In the trough, 10 magnets similar to those described in Example I above were placed about $\frac{1}{2}$ inch apart with the gap between the adjacent magnets being loosely filled with ordinary steel wool. As the emulsion flowed down the trough, the ferromagnetic aqueous phase was retained in the gaps between the magnets and clean mineral oil free of water was collected at the discharge of the trough.

The ferromagnetic lignosulfonate composition was prepared by adding ferrous sulfate to a lignosulfonate solution in an amount of 20 percent iron, based upon the lignosulfonate solids. To the solution one equivalent of sodium hydroxide for an equivalent of iron was added and the mixture reacted at 90° C with agitation under atmospheric conditions to oxidize a portion of the ferrous iron to ferric. After the reaction was complete, additional ferrous sulfate was added, followed by sodium hydroxide and heating continued. The product obtained upon drying contained 20% iron and had a relative magnetic susceptibility, based upon the iron content, about 100% greater than a sample of magnetite.

What is claimed is:

1. A process for the removal from a fluid of an aqueous or a water-miscible liquid dispersed in the fluid, which comprises adding to the fluid a water-soluble ferromagnetic composition selected from the group consisting essentially of ferromagnetic iron lignosulfonates, ferromagnetic iron sulfonated tannins, and ferromagnetic sulfonated phenols condensed with an aldehyde, said ferromagnetic composition being prepared by dissolving an iron compound in an aqueous solution of the lignosulfonate, sulfonated tannin, or sulfonated phenol condensed with an aldehyde in an amount at least twice the stoichiometric amount to react with the sulfonate groups and reacting the mixture under conditions for the formation of magnetic iron oxide in the presence of an alkali and having the iron present in ferrous and ferric states, intermixing the ferromagnetic composition with the fluid in the presence of sufficient water to dissolve and mix a portion of the ferromagnetic composition with the dispersed liquid, and passing the fluid containing the ferromagnetic composition mixed with the dispersed liquid through a magnetic field to attract and separate the dispersed liquid containing the ferromagnetic composition from the fluid, said ferromagnetic composition being added to the fluid in a sufficient amount to mix with the dispersed liquid for the dispersed liquid to be attracted by the magnetic field.

2. A process according to claim 1 wherein the water-soluble ferromagnetic composition is a ferromagnetic iron sulfonated tannin.

3. A process according to claim 1 wherein the water-soluble ferromagnetic composition is a ferromagnetic iron lignosulfonate.

4. A process according to claim 3 wherein a ferromagnetic lignosulfonate contains from 9 to 45 percent iron.

5. A process according to claim 4 wherein the ferromagnetic lignosulfonate is intermixed with the dispersed liquid in an amount to provide a concentration of the ferromagnetic lignosulfonate in a dispersed liquid in a range of from 5 to 20 weight percent.

6. A process according to claim 4 wherein the dispersed liquid is water and the ferromagnetic composition is supplied in the amount to obtain a concentration of from 5 to 20 percent in the dispersed water.

7. A process according to claim 4 wherein the ferromagnetic iron lignosulfonate is prepared by dissolving a ferrous inorganic salt in a lignosulfonate solution and reacting the mixture under atmospheric conditions at a temperature above 85° C with one equivalent of alkali per equivalent of iron.

8. A process according to claim 7 wherein the lignosulfonate is reacted with iron in an amount to obtain a ferromagnetic iron lignosulfonate containing from 15 to 35 percent iron.

9. A process according to claim 8 wherein the dispersed liquid is water and the fluid is a hydrocarbon oil.

10. A process according to claim 9 wherein the ferromagnetic lignosulfonate is added to the water-oil mixture in an amount such that the ferromagnetic lignosulfonate concentration in the dispersed water is in a range of 5 to 20 percent.

11. A process according to claim 8 wherein the dispersed liquid is water and the fluid is a gaseous medium.

12. A process according to claim 11 wherein the gaseous medium is air.

* * * * *